(12) United States Patent
Yang

(10) Patent No.: US 8,970,934 B2
(45) Date of Patent: Mar. 3, 2015

(54) OPTICAL SYSTEM AND METHOD

(71) Applicant: General Electric Company, Schenectady, NY (US)

(72) Inventor: Dongmin Yang, Syracuse, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/922,513

(22) Filed: Jun. 20, 2013

(65) Prior Publication Data

US 2013/0278747 A1    Oct. 24, 2013

Related U.S. Application Data

(63) Continuation-in-part of application No. 13/630,373, filed on Sep. 28, 2012, and a continuation-in-part of application No. 13/448,691, filed on Apr. 17, 2012.

(51) Int. Cl.
| | |
|---|---|
| *G02F 1/01* | (2006.01) |
| *H04N 7/18* | (2006.01) |
| *G02B 27/28* | (2006.01) |
| *G02B 15/00* | (2006.01) |
| *G02B 23/24* | (2006.01) |

(52) U.S. Cl.
CPC ............... *G02F 1/01* (2013.01); *H04N 7/183* (2013.01); *G02B 27/286* (2013.01); *G02B 15/00* (2013.01); *G02B 23/2438* (2013.01); *G02B 23/2446* (2013.01)
USPC ........................................................ 359/240

(58) Field of Classification Search
CPC ................. G01J 4/04; G01J 4/00; G01J 4/02; G02B 27/26; G02B 5/3083; G02B 21/0092; G02B 26/00; G02B 5/3025; G02B 5/32; G01N 21/8803
USPC .............................. 359/240, 242, 256, 489.06
See application file for complete search history.

(56) References Cited

U.S. PATENT DOCUMENTS 3,658,409 A * 4/1972 Shimbo et al. ................ 359/303
4,783,152 A * 11/1988 Nishimoto ..................... 359/319

\* cited by examiner

*Primary Examiner* — Tuyen Tra
(74) *Attorney, Agent, or Firm* — Cooper Leagl Group, LLC

(57) ABSTRACT

An optical system in a video probe assembly includes a plurality of lenses configured to refract separate linearly polarized rays under different refractive indexes to form a plurality of different focal lengths. The optical system includes at least one light modulating element that modulates a polarization state of the linearly polarized rays passing through the at least one light modulating element in response to a control signal. The optical system includes a polarizer element that filters out some of the modulated linearly polarized rays passing through the polarizer element. A method of inspecting a target with an optical system of a video probe assembly is also provided.

20 Claims, 9 Drawing Sheets

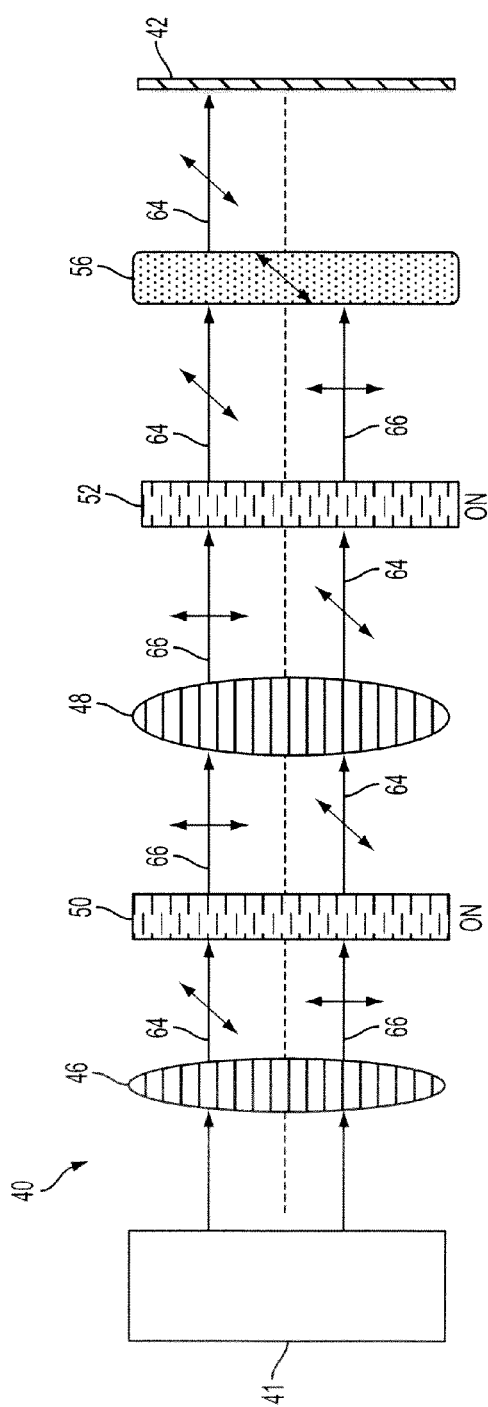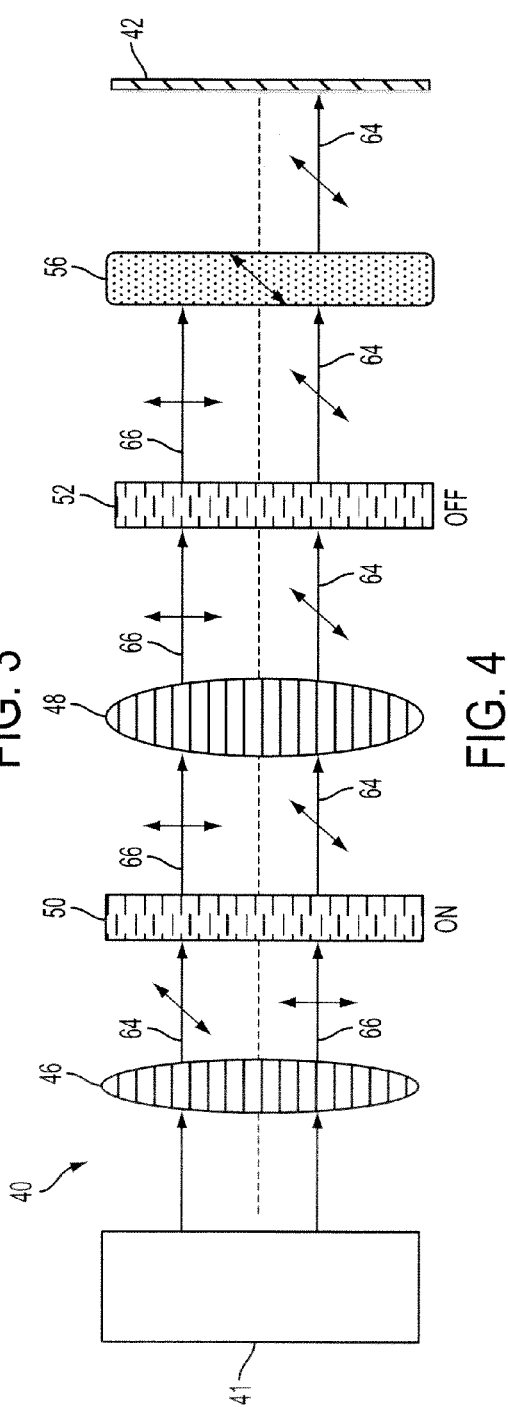

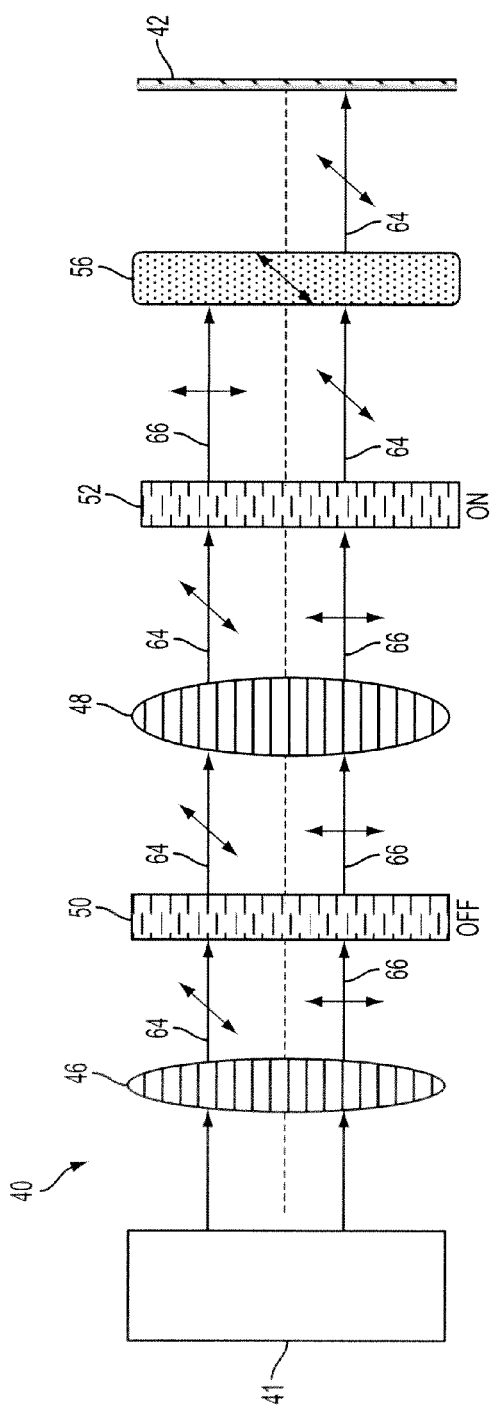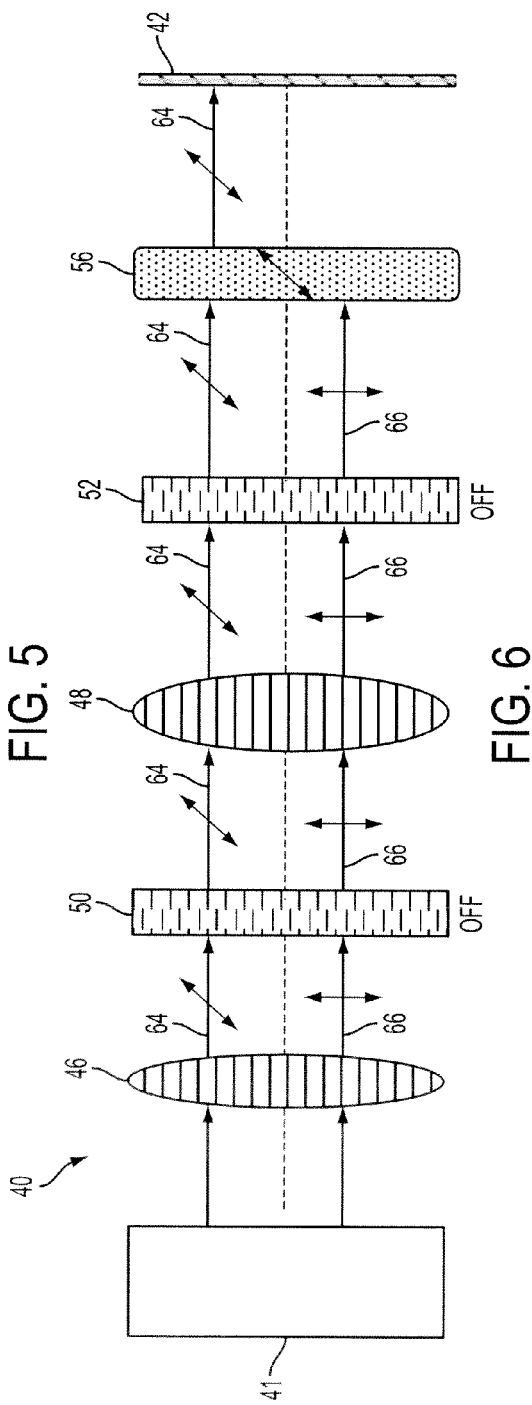

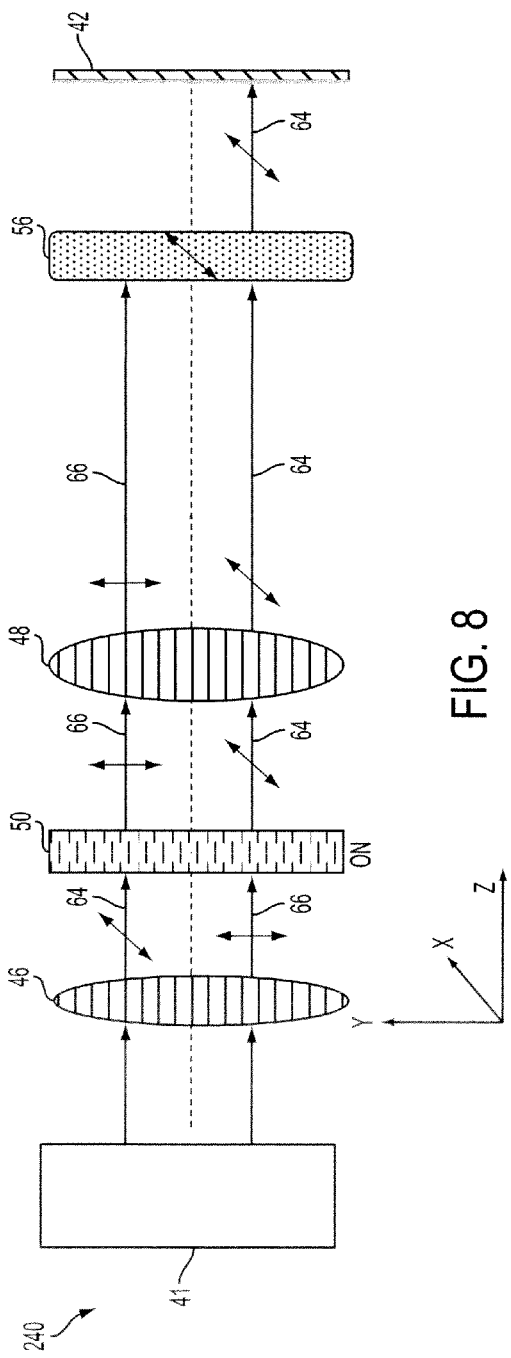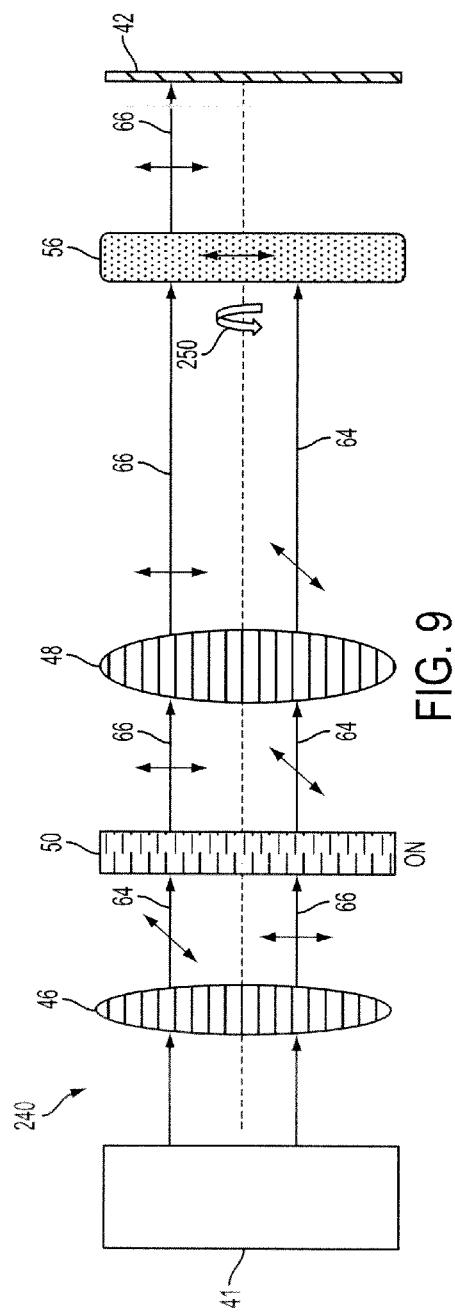

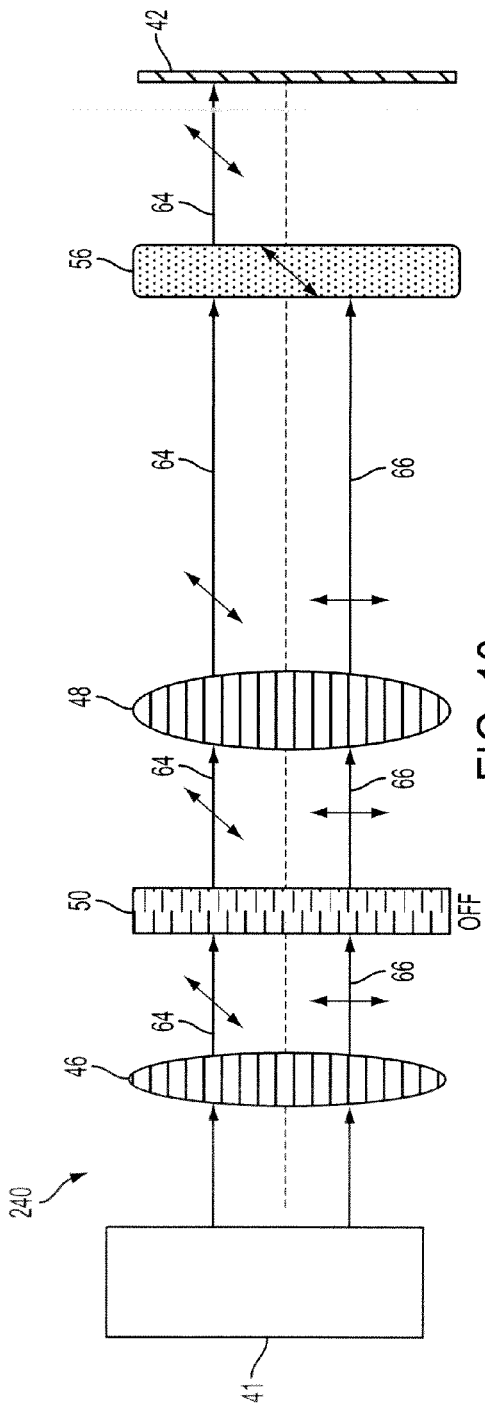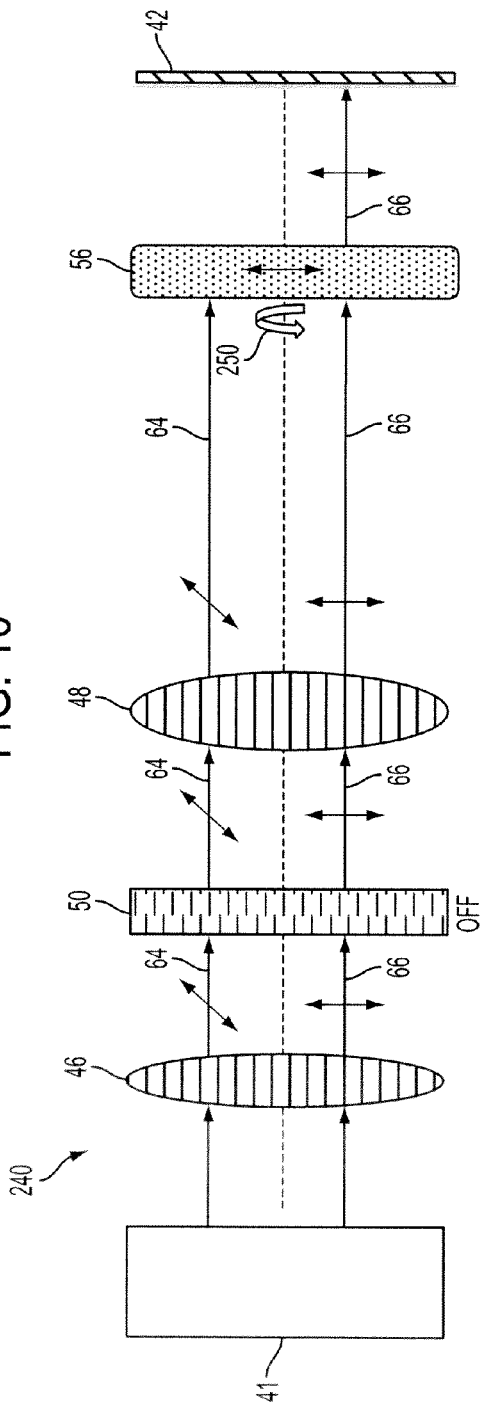

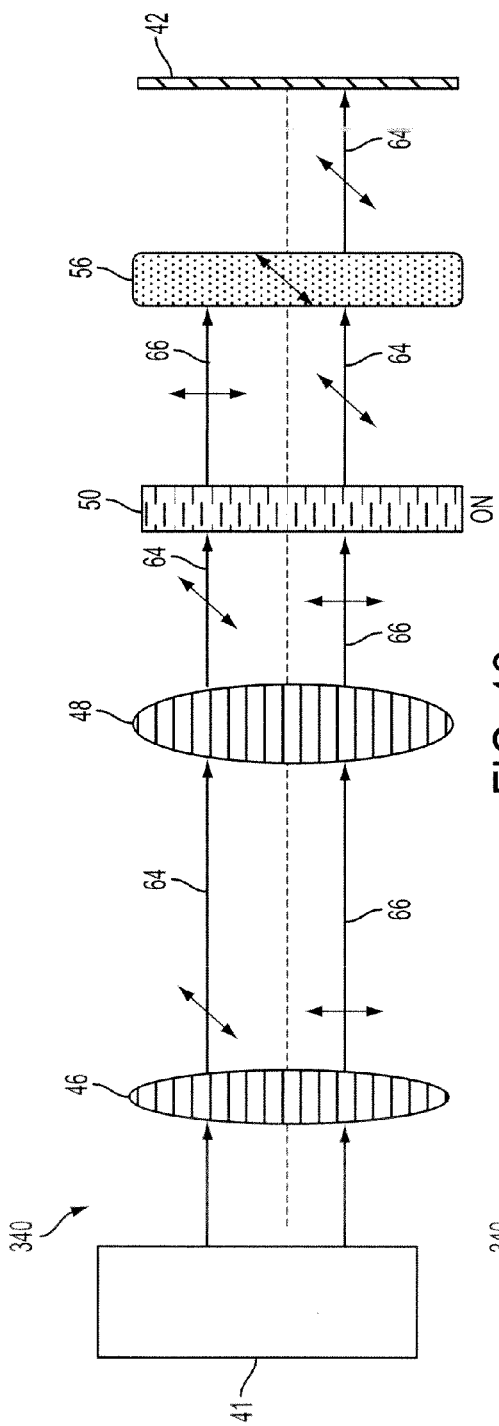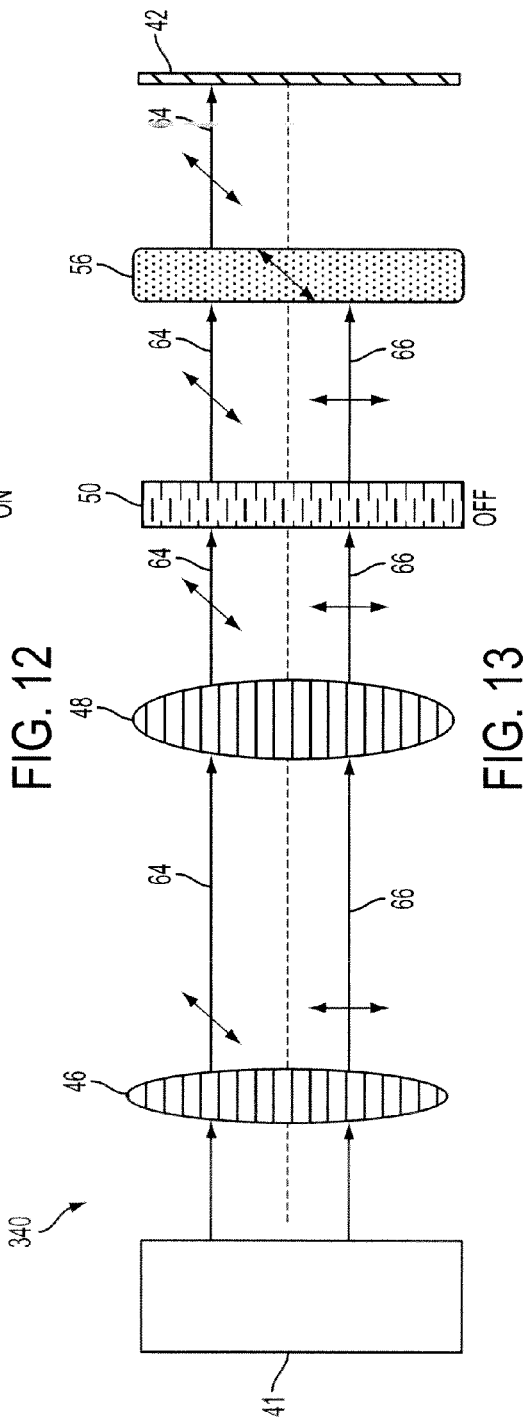

OPTICAL SYSTEM AND METHOD

CROSS-REFERENCE TO RELATED APPLICATION

The present application is a Continuation-In-Part of U.S. patent application Ser. No. 13/630,373, filed Sep. 28, 2012 and Ser. No. 13/448,691, filed Apr. 17, 2012, the entire disclosures of which are incorporated herein by reference.

BACKGROUND OF THE INVENTION

1. Field of the Invention

The present invention relates generally to an optical probe assembly and, more particularly, to an optical system exhibiting multiple focal lengths.

2. Discussion of the Prior Art

Video probe assemblies include borescopes, videoscopes, fiberscopes, endoscopes, etc. Video probe assemblies are types of non-destructive evaluation tools that can inspect inaccessible and/or hard to reach environments for targets such as defects, wear and tear, inclusions, deformations, cracks, openings, etc. When a target is illuminated within the environment, an image of the target can be formed with an optical system housed within the video probe assembly.

In past examples, the optical system of existing probes were capable of only relatively small focal length changes. This relatively small focal length change made it difficult for the video probe assembly to inspect a large range of field, as the targets (e.g., defects, wear and tear, inclusions, cracks, openings, etc.) were frequently out of focus. Further, movement of the probe assembly to improve focus was relatively limited due to size constraints within the environment. Accordingly, it would be beneficial to provide an optical system that exhibits a larger range of focal length changes to improve focus and zooming functionalities.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description presented below.

In accordance with one aspect, an optical system in a video probe assembly includes a plurality of lenses configured to refract separate linearly polarized rays under different refractive indexes to form a plurality of different focal lengths. The optical system includes a plurality of light modulating elements each configured to modulate a polarization state of the linearly polarized rays passing through the respective light modulating elements in response to a control signal. A polarizer element filters out some of the linearly polarized rays passing through the polarizer element.

In accordance with another aspect, an optical system in a video probe assembly includes a plurality of lenses configured to refract separate linearly polarized rays under different refractive indexes to form a plurality of different focal lengths. The optical system includes at least one light modulating element configured to modulate a polarization state of the linearly polarized rays passing through the at least one light modulating element in response to a control signal. A rotatable polarizer element filters out some of the linearly polarized rays passing through the polarizer element to produce at least four different focal lengths.

In accordance with another aspect, a method of inspecting a target with an optical system of a video probe assembly is provided. The method includes providing a plurality of lenses for refracting separate linearly polarized rays under different refractive indexes to form a plurality of different focal lengths. The method includes directing the linearly polarized rays through at least one light modulating element. The method includes focusing the linearly polarized rays onto an imager.

BRIEF DESCRIPTION OF THE DRAWINGS

The foregoing and other aspects of the present invention will become apparent to those skilled in the art to which the present invention relates upon reading the following description with reference to the accompanying drawings, in which:

FIG. 3 is a schematic view of an examplary optical system of the video probe assembly of FIG. 2 in a first mode of operation;

FIG. 4 is a schematic view of the optical system of the video probe assembly in a second mode of operation;

FIG. 5 is a schematic view of the optical system of the video probe assembly in a third mode of operation;

FIG. 6 is a schematic view of the optical system of the video probe assembly in a fourth mode of operation;

FIG. 8 is a schematic view of a third example optical system of the video probe assembly in accordance with an aspect of the present invention and in a first mode of operation;

FIG. 9 is a schematic view of the third optical system of the video probe assembly in a second mode of operation;

FIG. 10 is a schematic view of the third optical system of the video probe assembly in a third mode of operation;

FIG. 11 is a schematic view of the third optical system of the video probe assembly in a fourth mode of operation;

FIG. 12 is a schematic view of a fourth example optical system of the video probe assembly in accordance with an aspect of the present invention and in a first mode of operation;

FIG. 13 is a schematic view of the fourth optical system of the video probe assembly in a second mode of operation.

DETAILED DESCRIPTION OF THE INVENTION

Figure 1:
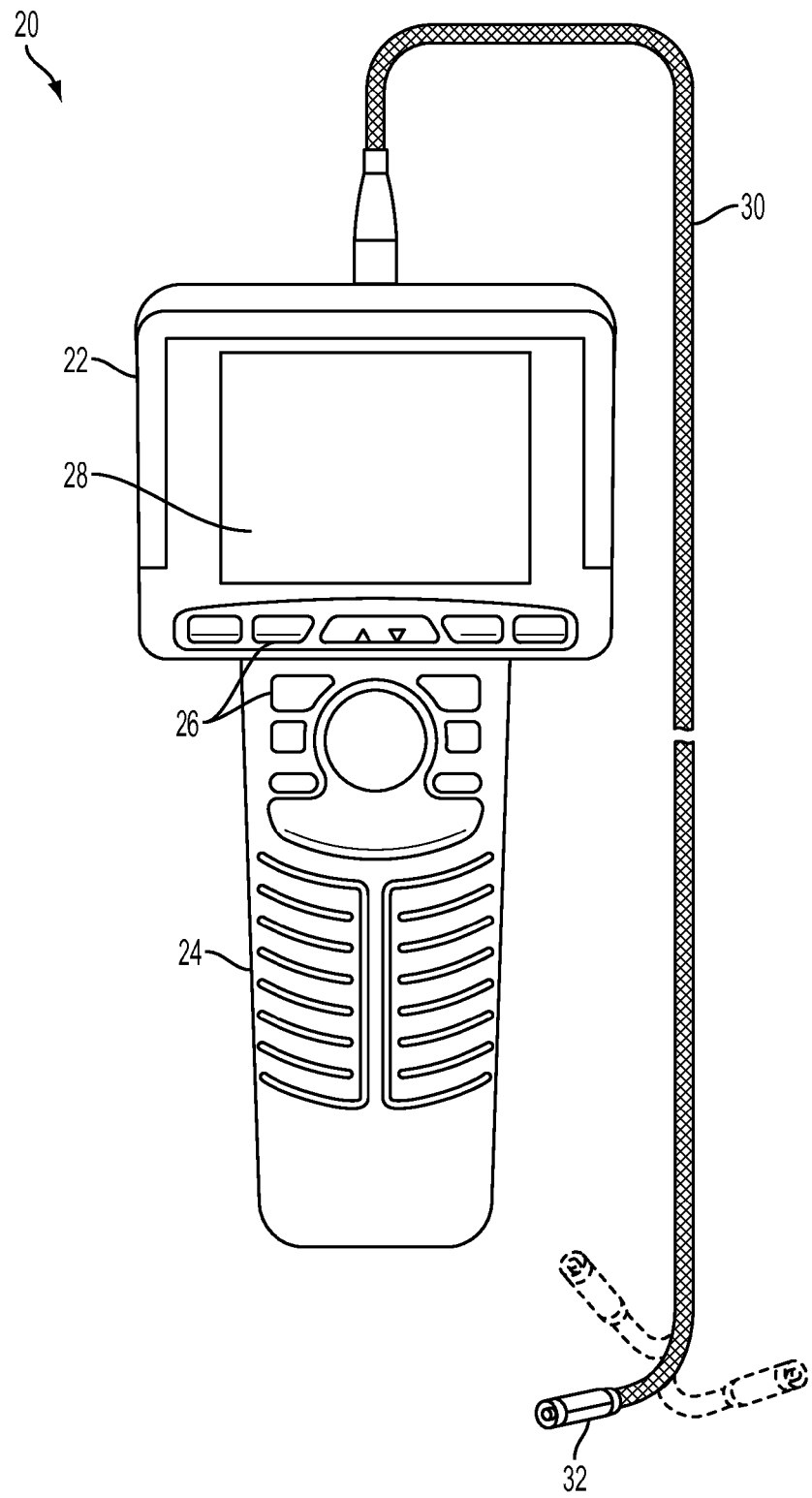
FIG. 1 is a perspective view of an example video probe assembly having at least one aspect in accordance with an aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

FIG. 1 depicts an example embodiment of a video probe assembly 20 in accordance with one aspect of the invention. It is to be appreciated that FIG. 1 merely shows one example of the possible structure/configuration of the video probe assembly 20, and that other examples are contemplated within the scope of the present invention. In general, the video probe assembly 20 may be used in areas that have some level of limitation concerning physical/visual accessibility. In an example, the video probe assembly 20 includes camera or other similar image or video intaking/recording device as discussed below. Such camera or other similar image or video intaking/recording device can be inserted into an area (e.g., a limited access area of a structure, device, etc.) for operation to in-take images of the area.

The video probe assembly 20 includes a handset assembly 22. It is to be understood that the handset assembly 22 of FIG. 1 includes only one of many possible structures/configurations of the handset assembly 22. Indeed, the handset assembly 22 in this example includes a single display structure, though in other examples, the handset assembly 22 may include a plurality of structures/housings. In an example, the handset assembly 22 may have a level of ergonomic design such that the handset assembly 22 can be easily handheld.

The handset assembly 22 includes a handle portion 24. The handle portion 24 is sized and shaped so as to be easily grasped by a human hand. In the shown example, the handle portion 24 is elongated and substantially linearly extending with rounded/arcuate corners and edges. The handle portion 24 is not limited to the shown shape, and in other examples, could include any variety of shapes.

The handset assembly 22 further includes a keypad 26. The keypad 26 includes one or more control/function buttons that allow a user to control and/or input information to the handset assembly 22. The handset assembly 22 can further include a display 28. Within the shown example, the display 28 is located adjacent and above the keypad 26 and handle portion 24, though other locations are envisioned. The display 28 can include a screen, monitor, or other similar image displaying apparatus. The display 28 can include associated video controllers, drivers, etc. to provide imagery upon the display 28.

The video probe assembly 20 further includes a probe device 30 operatively connected to the handset assembly 22. The probe device 30 is an elongated, flexible structure, in which a portion of the probe device 30 can be moved and/or articulated (as shown by the phantom drawn positions within FIG. 1). It is to be appreciated that in other examples, the probe device 30 could be longer or shorter in length, thicker or thinner in cross-sectional size, etc. The probe device 30 can include an elongated tube having a substantially hollow center portion. The hollow center portion of the probe device 30 can be sized to receive wires, cables, articulation cables, fiber optic bundles, and/or other mechanical, electrical or optical structures that extend through the probe device 30 to the handset assembly 22. In general, the probe device 30 is elongated so as to permit insertion of the probe device 30 into areas that have some level of limitation concerning accessibility. As illustrated by the phantom lines, the probe device 30 can be moved, such as by bending, rotating, or the like.

The probe device 30 includes a probe head 32 that can house a camera or other similar image or video intaking/recording device. The probe head 32 is disposed at a distal end of the probe device 30 opposite the handset assembly 22. The probe head 32 can be moved by articulation/movement of the probe device 30. In short summary, the probe head 32 can capture/record videos or images within a desired area with the camera. Via wires or other similar structures extending through the probe device 30, images/video can be transmitted from the probe head 32 to a remote location, such as the handset assembly 22. Accordingly, images/video of the area can then be displayed on the display 28 of the handset assembly 22, and may be stored/captured/recorded within/by the handset assembly 22.

Figure 2:
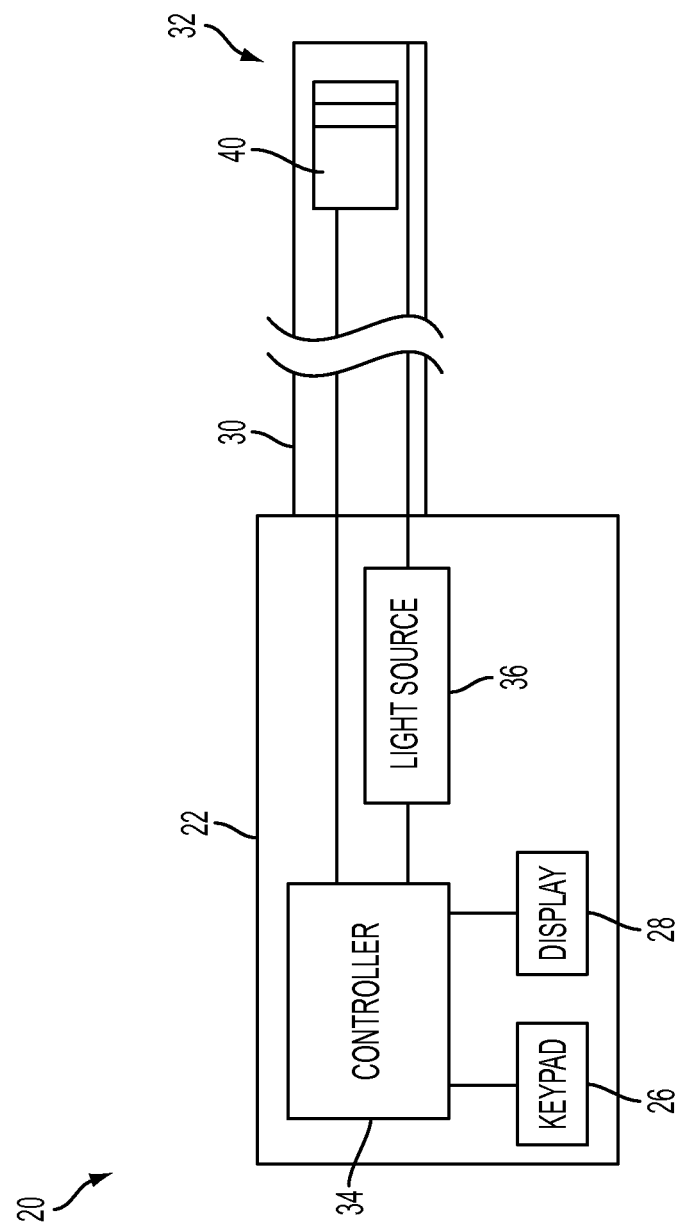
FIG. 2 is a schematic block diagram representation of the video probe assembly including an example optical system in accordance with an aspect of the present invention.

Turning now to FIG. 2, the video probe assembly 20 is illustrated in a highly schematic/generic representation for illustrative purposes. It is to be appreciated that the video probe assembly 20 is generically/schematically depicted for ease of illustrating structures/components that may not normally be visible. Indeed, the structure/components depicted in FIG. 2 may be located within the handset assembly 22 and/or the probe device 30, such that the structures/components may not be visible. It is also to be appreciated that FIG. 2 depicts only some of the unseen structure/components, but that the video probe assembly 20 includes further components (e.g., wires, electrical components, connectors, etc.) not shown in FIG. 2.

The handset assembly 22 can include a controller 34. The controller 34 is capable of sending/receiving information (e.g., data, control instructions, images, etc.) to other components within the video probe assembly 20. The controller 34 can include any number of structures associated with video probe assemblies. For example, the controller 34 can include a microcontroller, CPU, processor, printed circuit board, logic units, control units, memory or the like. In one example, the controller 34 can provide functions including, but not limited to, image capture, image enhancement, graphical overlay merging, distortion correction, frame averaging, scaling, digital zooming, overlaying, merging, flipping, motion detection, and/or video format conversion/compression. In another example, the controller 34 can store and/or read information.

The controller 34 can be operatively connected to the keypad 26 and the display 28. As such, the controller 34 can send information (i.e., optical information/images of a viewed environment) to the display 28 for providing imagery upon the display 28. Likewise, the controller 34 can receive information (i.e., movement information) from the keypad 26. In an example, the keypad 26 can control movement of the probe device 30 and/or the probe head 32.

The video probe assembly 20 can further include a light source 36. The light source 36 is operatively connected to the controller 34. In the illustrated example, the light source 36 is shown to be housed within the handset assembly 22, though in other examples, the light source 36 could instead be located within the probe device 30, e.g., as part of the probe head 32, or in both the handset assembly 22 and probe device 30. The light source 36 can generate light that can be guided/focused onto a target. In one example, light from the light source 36 can be transmitted through the probe device 30 by a fiber optic bundle, though other light transmission structures are envisioned. The light source 36 can, in one example, generate white light, and may include any number of light source devices, including a mercury or metal halide arc lamp, halogen lamp, laser/phosphor system, LED based light source, etc.

The video probe assembly 20 includes an optical system 40 in accordance with an aspect of the present invention. The optical system 40 can be located within the probe device 30. In the illustrated example, the optical system 40 is disposed near an end of the probe device 30 towards the probe head 32. In other examples, however, the optical system 40 could be positioned closer to or farther from the end of the probe device 30. The optical system 40 is illustrated somewhat generically/schematically in FIG. 2 for illustrative purposes. Indeed, the optical system is not limited to the illustrated dimensions.

Also, the probe device 30 and optical system 40 are generically pointed/directed toward the right within FIG. 2. But it is to be appreciated that the pointing/directing can be varied as indicated above. The optical system 40 can be operatively connected to the controller 34 by one or more wires, a fiber optic bundle, or the like. The operative connections can be for movement for pointing/directing, conveyance of information, control of the optical system 40 as discussed below, etc.

Turning now to FIG. 3, an example of the optical system 40, in accordance with at least one aspect of the present invention, is illustrated. Within FIG. 3, the optical system 40 is generically pointed/directed toward the left within FIG. 2 toward a target 41, which represents the area to be viewed. The generic pointing/directing is to indicate that pointing/directing can be varied. Although not shown within FIG. 3, the light source 36 can provide light and illuminate the target 41. It is to be appreciated that the target 41 (e.g., the area to be viewed) is somewhat generically/schematically depicted, as the target 41 includes any number of structures. For example, the target 41 can include voids, cracks, inclusions, deformities, openings, etc. When the target 41 is illuminated, an image of the target can be formed by the optical system 40. This image may then be transmitted through the probe device 30 and to the handset assembly 22, whereupon the image can be shown on the display 28, and/or may be recorded, captured, stored in memory, etc.

Focusing upon the example optical system 40, the optical system 40 can include an imager 42. The imager 42 may include one or more pixels formed in multiple rows and columns. The imager 42 can generate image signals in the form of voltages (e.g., analog voltages) that are representative of light incident on the pixels of the imager 42. In an example, these image signals can be transmitted from the imager 42 to the handset assembly 22 to be shown on the display 28.

The optical system 40 can include two or more lenses. In the illustrated example, the optical system 40 includes a first lens 46 and a second lens 48 (e.g., a plurality of lenses). In other examples, however, the optical system 40 is not limited to including the first lens 46 and second lens 48, and instead could include more lenses than as illustrated. The first lens 46 and second lens 48 can be generally identical in size, shape, structure, and material, though in other examples, the first lens 46 and second lens 48 can be of different sizes, shapes, materials, etc. Also, although the first lens 46 and second lens 48 are each schematically shown as single lens components, it is to be appreciated that each lens could be of multi-lens component construction with more than two refractive surfaces and/or the refractive surfaces could have various surface contours, spacings, etc. Herein "lens" is to be interpreted to be inclusive of such variations.

The first lens 46 and second lens 48 can include a birefringent element. For example, the first lens 46 and second lens 48 can include birefringent lenses that can refract light of different states of polarization under different refractive indexes correspondingly. In one example, light (e.g., un-polarized light, etc.) may be reflected from the target 41. The light incident to the first lens 46 and/or second lens 48 can, in one example, be decomposed into separate linearly polarized rays by the birefringent element(s). The separate linearly polarized rays can include, for example, extra-ordinary ray (e-beam ray) and ordinary ray (o-beam ray) light. The extraordinary ray (e-beam ray) light can be refracted by the first lens 46 and/or second lens 48 under a first refractive index. The ordinary-ray (o-beam ray) light can be refracted by the first lens 46 and/or second lens 48 under a second refractive index that may be the same as or different from the first refractive index.

The first lens 46 and second lens 48 can include any number of materials. For instance, the first lens 46 and/or second lens 48 can include Yttrium orthovanadate ($YVO_4$) to refract the light. $YVO_4$ is a type of birefringent material that can exhibit different refractive indexes with respect to incident light having different incident angles and states of polarization with respect to the optical axis thereof. In other examples, the first lens 46 and/or second lens 48 may include other materials such as α-BBO Crystal ($BaB_2O_4$), Calcite, Lithium Niobate, Quartz, or a combination of such materials. In other examples, the first lens 46 and/or second lens 48 can include other materials that can decompose light of different polarization states under different refractive indexes correspondingly, such as one or more polarization splitting prism elements to create a different optical path length for different polarization states of light.

The optical system 40 can include two or more light modulating elements. In the illustrated example, the optical system 40 includes a first light modulating element 50 and a second light modulating element 52 (e.g., a plurality of light modulating elements). In other examples, however, the optical system 40 is not limited to including the first light modulating element 50 and second light modulating element 52, and instead could include more light modulating elements than as illustrated. In the illustrated example, the first light modulating element 50 and second light modulating element 52 can be generally identical in size, shape, structure, and material, though in other examples, the first light modulating element 50 and second light modulating element 52 can be different.

The light modulating elements (e.g., first light modulating element 50 and second light modulating element 52) can modulate and/or change a polarization state of the linearly polarized rays in response to a control signal. In one example, the control signal can include a voltage applied to the first light modulating element 50 and/or the second light modulating element 52. In particular, when linearly polarized rays are directed to pass through either of the first light modulating element 50 or second light modulating element 52, the polarization state of the linearly polarized rays can be modulated/changed by driving the light modulating elements 50, 52 with different voltages. For example, an incident light ray to the first light modulating element 50 or second light modulating element 52 may be in a vertical linear polarization state. When one or both of the light modulating elements 50, 52 are driven with a voltage of 0 volts, the emergent light ray from either of the first light modulating element 50 or second light modulating element 52 may remain in the vertical linear polarization state. When one or both of the light modulating elements 50, 52 are driven with a voltage larger than a threshold value, such as, in one example, 5 volts, the emergent light from either of the first light modulating element 50 or second light modulating element 52 may be modulated/changed into a horizontal linear polarization state.

In another example, the state of the polarization of the linearly polarized rays can instead be modulated by not driving the light modulating elements 50, 52 with voltages. In such an example, when one or both of the light modulating elements 50, 52 are driven with a voltage of 0 volts, the emergent light ray from either of the first light modulating element 50 or second light modulating element 52 may be changed into a horizontal linear polarization state. When one or both of the light modulating elements 50, 52 are driven with a voltage larger than a threshold value, such as, in one example, 5 volts, the emergent light from either of the first light modulating element 50 or second light modulating element 52 may remain in the vertical linear polarization state.

The first light modulating element 50 and second light modulating element 52 may include any number of materials. In one example, the first light modulating element 50 and second light modulating element 52 may include a liquid crystal. In other examples, the first light modulating element 50 and second light modulating element 52 are not limited to liquid crystal and, instead, can include, a Faraday rotator, an optoelectric crystal, a wave plate, etc. that can modulate the polarization state of incident light. Likewise, the first light modulating element 50 and second light modulating element 52 can include the same/identical materials, or in other examples, can include different materials.

The optical system 40 can include one or more polarizer elements 56. In the illustrated example, the optical system 40 includes one polarizer element 56. In other examples, however, the optical system 40 is not limited to including a single polarizer element, and instead could include a plurality of polarizer elements.

The polarizer element 56 can filter out linearly polarized rays in one fixed polarization state, such as a horizontal or vertical linear polarization state. For instance, in the illustrated example, the polarizer element 56 can filter out vertical linearly polarized rays (e.g., e-beam rays in this example). As such, e-beam rays are filtered out by the polarizer element 56 while o-beam rays can pass through the polarizer element 56. In other examples, the polarizer element 56 can filter out horizontal linearly polarized rays (e.g., o-beam rays in this example). In such an example, o-beam rays are filtered out by the polarizer element 56 while e-beam rays can pass through the polarizer element 56.

The polarizer element 56 may filter out linearly polarized rays based on an optical reflection mechanism. The polarizer element 56 can include a polymer polarizing film, a grating polarizer, a Glan-Taylor polarizer, a Glan-Thompson polarizer, or a piece stack polarizer, for example. In another example, the polarizer element 56 may filter out linearly polarized rays based on an optical refraction mechanism. In such an example, the polarizer element 56 may include a Rochon polarizer or a Wollaston polarizer, for example. In yet another example, the polarizer element 56 may filter out linearly polarized rays based on an optical absorption mechanism. In such an example, the polarizer element 56 may include a polymer polarizing film.

In the illustrated example of FIG. 3, the optical system 40 is arranged with the first lens 46 being closest to the target 41, followed by the first light modulating element 50, second lens 48, second light modulating element 52, polarizer element 56, and imager 42. In other examples, however, the optical system 40 is not limited to this arrangement. Rather, the elements (e.g., first and second lens, first and second light modulating elements, polarizer element, etc.) could be arranged in a different order. Further, the distances separating each of the elements is not limited to the illustrated example. Rather, the elements could be closer or farther apart than as illustrated, as the optical system 40 of FIG. 3 is not drawn to scale. Thus, it should be appreciated that the shown distances are only generic and are not to be taken as reference. In addition, further, unshown elements could be provided, including apertures, stop elements, additional polarizer elements, or the like.

Referring still to FIG. 3, an o-beam ray 64 emerging from the first lens 46 or second lens 48 can include horizontal linearly polarized rays. This horizontal linearly polarized ray is illustrated with an oblique double arrow line "⤢". An e-beam ray 66 emerging from the first lens 46 or second lens 48 can include vertical linearly polarized rays. This vertical linearly polarized ray is illustrated with an upright double arrow line "↕". In the illustrated examples, the first light modulating element 50 and second light modulating element 52 can modulate/change the polarization state of the linearly polarized rays passing through the light modulating elements 50, 52 when the light modulating elements 50, 52 are driven with a voltage, such as 5 volts. As such, when one or both of the light modulating elements 50, 52 is turned on (e.g., driven with voltage), the light passing through the light modulating elements 50, 52 will change from o-beam rays 64 ("⤢") into e-beam rays 66 ("↕") or from e-beam rays 64 ("↕") into o-beam rays 66 ("⤢").

Each of the first lens 46 and second lens 48 can include two separate focal lengths, $f_o$ and $f_e$. In particular, the first lens 46 includes two focal lengths: $f1_o$ for o-beam rays 64 passing through the first lens 46 and $f1_e$ for e-beam rays 66 passing through the first lens 46. Likewise, the second lens 48 includes two focal lengths: $f2_o$ for o-beam rays 64 passing through the second lens 48 and $f2_e$ for e-beam rays 66 passing through the second lens 48. As such, light (e.g., o-beam rays 64 and e-beam rays 66) passing through the first lens 46 can form two focus plane images, while light passing through the second lens 48 can also form two focus plane images.

In an example, the optical system 40 may include two lenses (e.g., first lens 46 and second lens 48) with two separate focal lengths (e.g., f1 for the first lens 46 and f2 for the second lens 48). The two lenses can be separated by a distance "d". As such, the optical system 40 can have an overall focal length of "f". Equation (1) represents the overall focal length of the optical system:

$$f = \frac{f1 * f2}{f1 + f2 - d} \qquad (1)$$

The operation of the optical system 40 illustrated in FIG. 3 can now be described. In this example, the first light modulating element 50 and second light modulating element 52 can each be turned on (illustrated as "ON" in FIG. 3) and driven with a voltage. The o-beam ray 64 and e-beam ray 66 can each pass through the first lens 46 that has a focal length of $f1_o$ and $f1_e$, respectively. Next, the o-beam ray 64 and e-beam ray 66 passing through the first light modulating element 50, which is turned on in this example, can be modulated/changed. In particular, the polarization state of the o-beam ray 64 and e-beam ray 66 will change upon passing through the first light modulating element 50, such that the o-beam ray 64 changes to the e-beam ray 66, while the e-beam ray 66 changes to the o-beam ray 64.

The o-beam ray 64 and e-beam ray 66 can next pass through the second lens 48 that has a focal length of $f2_o$ and $f2_e$, respectively. The o-beam ray 64 and e-beam ray 66 can then pass through the second light modulating element 52, which is turned on in this example. Upon passing through the second light modulating element 52, the o-beam ray 64 and e-beam ray 66 are modulated/changed, such that the polarization state of the o-beam ray 64 and e-beam ray 66 will change. As such, the o-beam ray 64 passing through the second light modulating element 52 will change to the e-beam ray 66, while the e-beam ray 66 passing through the second light modulating element 52 will change to the o-beam ray 64.

After exiting the second light modulating element 52, the o-beam ray 64 and e-beam ray 66 can arrive at the polarizer element 56. In this example, the polarizer element 56 will filter out vertical linearly polarized rays (e.g., e-beam rays 66). As such, o-beam rays 64 can pass through the polarizer element 56 while e-beam rays 66 are filtered out and prevented from passing through the polarizer element 56. In this example, the o-beam rays 64 that pass through and exit the polarizer element 56 can be focused onto the imager 42. The o-beam rays 64 in this example have a focal length illustrated in equation (2):

$$f = \frac{f1_o * f2_e}{f1_o + f2_e - d} \quad (2)$$

Turning now to FIG. 4, it should be appreciated that the shown distances, in particular the distance to the target 41 since the distance can vary, are only generic and are not to be taken as reference and should not be taken in comparison to FIG. 3. In FIG. 4 the optical system 40 is illustrated in a second mode of operation. In this example, the first light modulating element 50 can be turned on (illustrated as "ON" in FIG. 4) and driven with a voltage while the second light modulating element 52 can be turned off (illustrated as "OFF" in FIG. 4). The o-beam ray 64 and e-beam ray 66 can each pass through the first lens 46 that has focal lengths of f1$_o$ and f1$_e$, respectively. Next, the o-beam ray 64 and e-beam ray 66 passing through the first light modulating element 50, which is turned on in this example, can be modulated/changed. In particular, the polarization state of the o-beam ray 64 and e-beam ray 66 will change, such that the o-beam ray 64 changes to the e-beam ray 66, while the e-beam ray 66 changes to the o-beam ray 64.

The o-beam ray 64 and e-beam ray 66 can next pass through the second lens 48 that has a focal length of f2$_o$ and f2$_e$, respectively. The o-beam ray 64 and e-beam ray 66 can then pass through the second light modulating element 52, which is turned off in this example. Upon passing through the second light modulating element 52, the o-beam ray 64 and e-beam ray 66 are not modulated/changed, such that the polarization state of the o-beam ray 64 and e-beam ray 66 will remain the same upon exiting the second light modulating element 52.

After exiting the second light modulating element 52, the o-beam ray 64 and e-beam ray 66 can arrive at the polarizer element 56. In this example, the polarizer element 56 will again filter out vertical linearly polarized rays (e.g., e-beam rays 66), such that o-beam rays 64 will pass through and exit the polarizer element 56. These o-beam rays 64 will therefore have a focal length illustrated in equation (3):

$$f = \frac{f1_e * f2_o}{f1_e + f2_o - d} \quad (3)$$

Turning now to FIG. 5, it should be appreciated that the shown distances, in particular the distance to the target 41 since the distance can vary, are only generic and are not to be taken as reference and should not be taken in comparison to FIG. 3 or 4. In FIG. 5, the optical system 40 is illustrated in a third mode of operation. In this example, the first light modulating element 50 can be turned off (illustrated as "OFF" in FIG. 5) while the second light modulating element 52 can be turned on (illustrated as "ON" in FIG. 5) and driven with a voltage. The o-beam ray 64 and e-beam ray 66 can each pass through the first lens 46 that has focal lengths of f1$_o$ and f1$_e$, respectively. Next, the o-beam ray 64 and e-beam ray 66 can pass through the first light modulating element 50, which is turned off in this example. Upon passing through the first light modulating element 50, the o-beam ray 64 and e-beam ray 66 are not modulated/changed, such that the polarization state of the o-beam ray 64 and e-beam ray 66 will remain the same upon exiting the first light modulating element 50.

The o-beam ray 64 and e-beam ray 66 can next pass through the second lens 48 that has a focal length of f2$_o$ and f2$_e$, respectively. The o-beam ray 64 and e-beam ray 66 can then pass through the second light modulating element 52, which is turned on in this example. As such, the polarization state of the o-beam ray 64 and e-beam ray 66 will change, such that the o-beam ray 64 changes to the e-beam ray 66 while the e-beam ray 66 changes to the o-beam ray 64.

After exiting the second light modulating element 52, the o-beam ray 64 and e-beam ray 66 can arrive at the polarizer element 56. In this example, the polarizer element 56 will again filter out vertical linearly polarized light rays (e.g., e-beam rays 66), such that o-beam rays 64 will pass through and exit the polarizer element 56. These o-beam rays 64 can have a focal length illustrated in equation (4):

$$f = \frac{f1_e * f2_e}{f1_e + f2_e - d} \quad (4)$$

Turning now to FIG. 6, it should be appreciated that the shown distances, in particular the distance to the target 41 since the distance can vary, are only generic and are not to be taken as reference and should not be taken in comparison to FIGS. 3-5. In FIG. 6, the optical system 40 is illustrated in a fourth mode of operation. In this example, the first light modulating element 50 and second light modulating element 52 can each be turned off (illustrated as "OFF" in FIG. 6). The o-beam ray 64 and e-beam ray 66 can each pass through the first lens 46 that has focal lengths of f1$_o$ and f1$_e$, respectively. Next, the o-beam ray 64 and e-beam ray 66 can pass through the first light modulating element 50, which is turned off in this example. Upon passing through the first light modulating element 50, the o-beam ray 64 and e-beam ray 66 are not modulated/changed, such that the polarization state of the o-beam ray 64 and e-beam ray 66 will remain the same upon exiting the first light modulating element 50.

The o-beam ray 64 and e-beam ray 66 can next pass through the second lens 48 that has a focal length of f2$_o$ and f2$_e$, respectively. The o-beam ray 64 and e-beam ray 66 can then pass through the second light modulating element 52, which is also turned off in this example. As such, the o-beam ray 64 and e-beam ray 66 are not modulated/changed, such that the polarization state of the o-beam ray 64 and e-beam ray 66 will remain the same upon exiting the second light modulating element 52.

After exiting the second light modulating element 52, the o-beam ray 64 and e-beam ray 66 can arrive at the polarizer element 56. In this example, the polarizer element 56 will again filter out vertical linearly polarized light rays (e.g., e-beam rays 66), such that o-beam rays 64 will pass through and exit the polarizer element 56. These o-beam rays 64 can have a focal length illustrated in equation (5):

$$f = \frac{f1_o * f2_o}{f1_o + f2_o - d} \quad (5)$$

Accordingly, as illustrated in equations (2) to (5), by controlling the first light modulating element 50 and second light modulating element 52, the optical system 40 can provide four different overall focal lengths. Additionally, in some examples, the optical system 40 can further provide a large enough focal length change to achieve an optical zoom function. The increase in discrete focal length changes can extend the focus adjustment range of the optical system 40, thus extending the depth of field for viewing the target 41.

Assuming that the first lens 46 includes a single lens made of a birefringement material, then the first lens 46 can include two surface curvatures: C1 and C2. A radius of curvature, denoted by R, can be represented by the equation: R=1/C. The first lens 46 can also include a refractive index of n, which includes refractive indexes of $n_o$ and $n_e$ for the two different polarized light rays (e.g., o-beam rays 64 and e-beam rays 66). Accordingly, the focal length (f1) of the first lens 46 can be represented with equation (6):

$$f1 = \frac{1}{(C1 - C2) * (n - 1)} \quad (6)$$

Next, differentiating equation (6) will yield:

$$df1 = \frac{(-1)}{(C1 - C2) * (n - 1)^2} * dn \quad (7)$$

Substituting $dn = n_o - n_e$ and $n = n_o$ into equation (7) will yield:

$$df1 = \frac{(n_e - n_o)}{(C1 - C2) * (n_o - 1)^2} \quad (8)$$

Because $(n_e - n_o)$ is relatively small (e.g., in the order of 0.01), the remaining portion of equation (8) is constant. As such, df1 is in the order of a constant *0.01, such that the focal length change is relatively small. Next, it can be assumed that:

$$f2 = A * f1 \quad (9)$$

Substituting equation (9) into equation (1) will yield:

$$f = \frac{A * f1^2}{f1 * (1 + A) - d} \quad (10)$$

Differentiating equation (6) will produce:

$$df = \frac{f1^2 * (3A^2 - A)}{[f1 * (1 + A) - d]^2} df1 \quad (11)$$

Accordingly, depending on the focal length (e.g., f1) and distance (e.g., d), df can be 2 to 10 times larger than df1. For instance, in one possible example, f1=4 mm, A=2, d=4 mm. In such an example, df=2.5*df1. As such, the optical system 40 having two lenses (e.g., first lens 46 and second lens 48) can magnify the focal length change that is created by a single lens birefringent material index change by 2.5. Additionally, with the optical system 40 having the two lenses (e.g., first lens 46 and second lens 48), two light modulating elements (e.g., first light modulating element 50 and second light modulating element 52) and the polarizer element 56, four separate focal lengths can be obtained. Thus, a greater range of distance to the target 41 is provided/accommodated.

Figure 7:
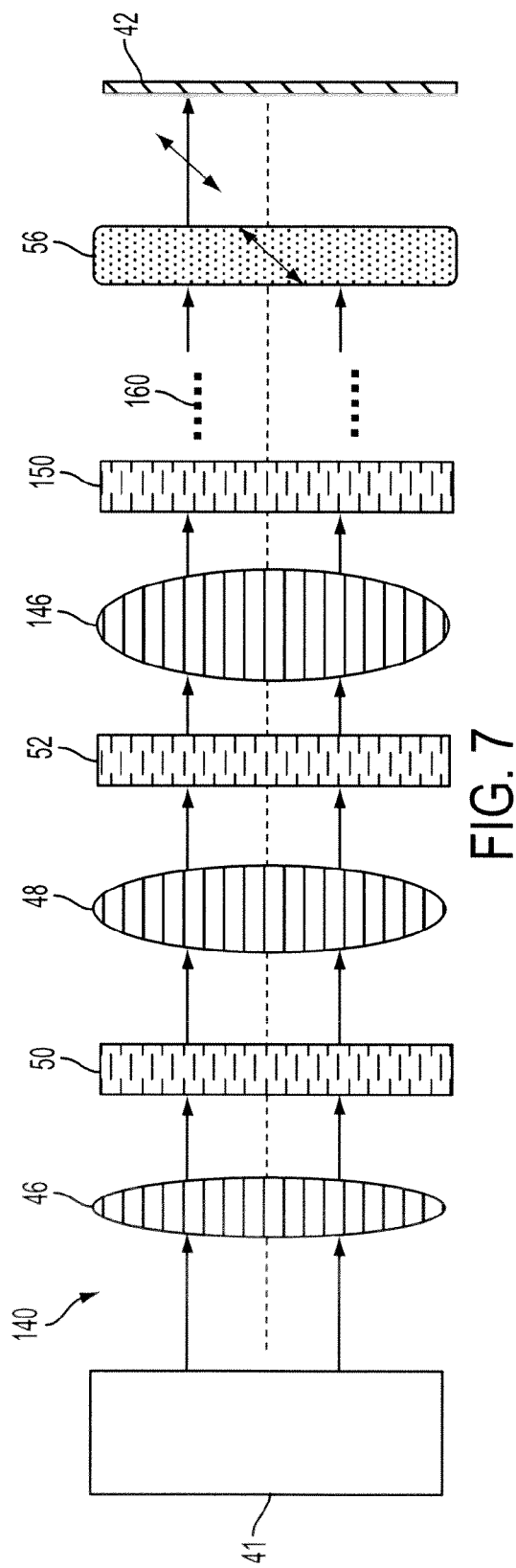
FIG. 7 is a schematic view of a second example optical system of the video probe assembly in accordance with an aspect of the present invention.

Turning now to FIG. 7, a second example optical system 140 is illustrated. The second optical system 140 is illustrated somewhat generically/schematically for illustrative purposes (e.g., shown distances are only generic). As with the optical system 40 of FIGS. 3 to 6, the second optical system 140 can be used within the video probe assembly 20, and thus in association with the handset assembly 22, probe device 30, etc.

The second optical system 140 can include, in one example, at least some features similar to the optical system 40 of FIGS. 3 to 6. For instance, the second optical system 140 can include the imager 42, first lens 46, second lens 48, first light modulating element 50, second light modulating element 52, and the polarizer element 56. These features are generally identical as described above with respect to the optical system of FIGS. 3 to 7, and need not be described in detail again.

The second optical system 140 can include a third lens 146. In the illustrated example, the third lens 146 can be positioned adjacent the second light modulating element 52 opposite the second lens 48. The third lens 146 can, in one example, be similar or identical to either of the first lens 46 or second lens 48. In particular, the third lens 146 can include a birefringent lens that refracts light of different states of polarization under different refractive indexes accordingly. In one example, the third lens 146 can include Yttrium orthovanadate ($YVO_4$) to refract the light. In other examples, the third lens 146 may include materials such as α-BBO Crystal ($BaB_2O_4$), Calcite, Lithium Niobate, Quartz, or a combination of such materials. The third lens 146 is not limited to these materials, however, and can include other materials that can decompose light of different polarization states under different refractive indexes correspondingly, such as one or more polarization splitting prism elements to create a different optical path length for different polarization states of light.

The second optical system 140 can include a third light modulating element 150. In the illustrated example, the third light modulating element 150 can be positioned adjacent the third lens 146 opposite the second light modulating element 52. The third light modulating element 150 can, in one example, be similar or identical to either of the first light modulating element 50 or the second light modulating element 52. In particular, the third light modulating element 150 can modulate and/or change a polarization state of the linearly polarized rays in response to control signals, which can include being driven with a voltage. For example, a light ray incident to the third light modulating element 150 may be in a vertical linear polarization state. When the third light modulating element 150 is driven with a voltage of 0 volts, the emergent light ray from the third light modulating element 150 may remain in the vertical linear polarization state. When the third light modulating element 150 is driven with a voltage larger than a threshold value, such as, in one example, 5 volts, the emergent light from the third light modulating element 150 may be changed into a horizontal linear polarization state.

It is to be understood that the second optical system 140 is not limited to including the first lens 46, second lens 48, and third lens 146 or the first light modulating element 50, second light modulating element 52 and third light modulating element 150. Rather, in other examples, the second optical system 140 could include more lenses than as shown, such as by including a total of four lenses, five lenses, etc. Likewise, the second optical system 140 could include more light modulating elements than as shown, such as by including a total of four light modulating elements, five light modulating elements, etc. Indeed, the additional optical elements are represented somewhat generically/schematically in FIG. 7 with a dashed line (e.g., dashed line 160).

With the third lens 146 and third light modulating element 150, the second optical system 140 can provide a larger focal length change range than as illustrated above with respect to FIGS. 3 to 6. Indeed, in an example, the second optical system 140 can provide a large enough focal length change to achieve an optical zoom as well as focus adjustment.

Turning now to FIG. 8, a third example optical system 240 is illustrated. The third optical system 240 is illustrated somewhat generically/schematically for illustrative purposes. As with the optical system 40 of FIGS. 3 to 6 and the second optical system 140 of FIG. 7, the third optical system 240 can be used in association with the video probe assembly 20, including the handset assembly 22, probe device 30, etc.

The third optical system 240 can include, in one example, at least some features similar to the optical system 40 of FIGS. 3 to 6 and the second optical system 140 of FIG. 7. For instance, the third optical system 240 can include the imager 42, the first lens 46, the second lens 48, and the first light modulating element 50. These features are generally identical as described above with respect to the optical system 40 of FIGS. 3 to 7, and need not be described in detail again.

The third optical system 240 can include the polarizer element 56. In this example, the polarizer element 56 can be rotated to filter out linearly polarized rays in one fixed polarization state, such as horizontal or vertical polarization state. For instance, in the illustrated example, the polarizer element 56 can filter out vertical linearly polarized light rays (e.g., e-beam rays 66 in this example). As such, e-beam rays 66 are filtered out by the polarizer element 56 while o-beam rays 64 can pass through the polarizer element 56. However, the polarizer element 56 can be rotated (i.e., clockwise or counter clockwise rotation 90° about z-axis illustrated in FIG. 8) to filter out horizontal linearly polarized light rays (e.g., o-beam rays 64). As such, once the polarizer element 56 is rotated, the o-beam rays 64 are filtered while the e-beam rays 66 can pass through the polarizer element 56.

Referring still to FIG. 8, an example of the operation of the third optical system 240 can now be described. In this example, the first light modulating element 50 can be turned on (illustrated as "ON" in FIG. 8) and driven with a voltage. The o-beam ray 64 and e-beam ray 66 can each pass through the first lens 46 that has a focal length of $f1_o$ and $f1_e$, respectively. Next, the o-beam ray 64 and e-beam ray 66 passing through the first light modulating element 50, which is turned on in this example, can be modulated/changed. In particular, the polarization state of the o-beam ray 64 and e-beam ray 66 will change upon passing through the first light modulating element 50, such that the o-beam ray 64 changes to the e-beam ray 66, while the e-beam ray 66 changes to the o-beam ray 64.

The o-beam ray 64 and e-beam ray 66 can next pass through the second lens 48 that has a focal length of $f2_o$ and $f2_e$, respectively. The o-beam ray 64 and e-beam ray 66 can then pass through the polarizer element 56. In this example, the polarizer element 56 is unrotated, such that the polarizer element 56 can filter out vertical linearly polarized light rays (e.g., e-beam rays 66). As such, o-beam rays 64 can pass through the polarizer element 56 and are focused onto the imager 42. The o-beam rays 64 in this example have a focal length illustrated in equation (12):

$$f = \frac{f1_e * f2_o}{f1_e + f2_o - d} \tag{12}$$

Turning now to FIG. 9 it should be appreciated that the shown distances, in particular the distance to the target 41 since the distance can vary, are only generic and are not to be taken as reference and should not be taken in comparison to FIG. 8. In FIG. 9, the third optical system 240 is illustrated in a second mode of operation. In this example, the first light modulating element 50 can be turned on (illustrated as "ON" in FIG. 9). The polarizer element 56 can be rotated (e.g., rotation 250 illustrated generically/schematically with arrow). This rotation 250 can be made in the clockwise or counter-clockwise directions, and in one example, the rotation 250 includes a 90° rotation. This rotation 250 can be selectively achieved in any number of ways, such as with mechanical/electromechanical structures, or the like.

The o-beam ray 64 and e-beam ray 66 can each pass through the first lens 46 that has focal lengths of $f1_o$ and $f1_e$, respectively. Next, the o-beam ray 64 and e-beam ray 66 passing through the first light modulating element 50, which is turned on in this example, can be modulated/changed. In particular, the polarization state of the o-beam ray 64 and e-beam ray 66 will change, such that the o-beam ray 64 changes to the e-beam ray 66, while the e-beam ray 66 changes to the o-beam ray 64.

The o-beam ray 64 and e-beam ray 66 can next pass through the second lens 48 that has a focal length of $f2_o$ and $f2_e$, respectively. The o-beam ray 64 and e-beam ray 66 can then pass through the polarizer element 56, which is rotated in this example. By being rotated, the polarizer element 56 can filter out horizontal linearly polarized light rays (e.g., o-beam rays 64). As such, e-beam rays 66 can pass through the polarizer element 56 and are focused onto the imager 42. The e-beam rays 66 in this example have a focal length illustrated in equation (13):

$$f = \frac{f1_o * f2_e}{f1_o + f2_e - d} \tag{13}$$

Turning now to FIG. 10 it should be appreciated that the shown distances, in particular the distance to the target 41 since the distance can vary, are only generic and are not to be taken as reference and should not be taken in comparison to FIG. 8 or 9. In FIG. 10, the third optical system 240 is illustrated in a third mode of operation. In this example, the first light modulating element 50 can be turned off (illustrated as "OFF" in FIG. 10). The o-beam ray 64 and e-beam ray 66 can each pass through the first lens 46 that has a focal length of $f1_o$ and $f1_e$, respectively. Next, the o-beam ray 64 and e-beam ray 66 passing through the first light modulating element 50, which is turned off in this example, may not be modulated/changed.

The o-beam ray 64 and e-beam ray 66 can next pass through the second lens 48 that has a focal length of $f2_o$ and $f2_e$, respectively. The o-beam ray 64 and e-beam ray 66 can then pass through the polarizer element 56. In this example, the polarizer element 56 is unrotated, such that the polarizer element 56 can filter out vertical linearly polarized light rays (e.g., e-beam rays 66). As such, o-beam rays 64 can pass through the polarizer element 56 and are focused onto the imager 42. The o-beam rays 64 in this example have a focal length illustrated in equation (14):

$$f = \frac{f1_o * f2_o}{f1_o + f2_o - d} \quad (14)$$

Turning now to FIG. 11 it should be appreciated that the shown distances, in particular the distance to the target 41 since the distance can vary, are only generic and are not to be taken as reference and should not be taken in comparison to FIGS. 8-10. In FIG. 11, the third optical system 240 is illustrated in a fourth mode of operation. In this example, the first light modulating element 50 can be turned off (illustrated as "OFF" in FIG. 11). The o-beam ray 64 and e-beam ray 66 can each pass through the first lens 46 that has a focal length of $f1_o$ and $f1_e$, respectively. Next, the o-beam ray 64 and e-beam ray 66 passing through the first light modulating element 50, which is turned off in this example, may not be modulated/changed.

The o-beam ray 64 and e-beam ray 66 can next pass through the second lens 48 that has a focal length of $f2_o$ and $f2_e$, respectively. The o-beam ray 64 and e-beam ray 66 can then pass through the polarizer element 56, which is rotated in this example. By being rotated, the polarizer element 56 can filter out horizontal linearly polarized light rays (e.g., o-beam rays 64).

As such, e-beam rays 66 can pass through the polarizer element 56 and are focused onto the imager 42. The e-beam rays 66 in this example have a focal length illustrated in equation (15):

$$f = \frac{f1_e * f2_e}{f1_e + f2_e - d} \quad (15)$$

Accordingly, as illustrated in equations (12) to (15), by controlling the first light modulating element 50 and the polarizer element 56, the third optical system 240 can provide four different overall focal lengths. Additionally, in some examples, the third optical system 240 can further provide a large enough focal length change to achieve an optical zoom function. The increase in discrete focal length changes can extend the focus adjustment range of the third optical system 240, thus extending the depth of field.

It is to be appreciated that the structures of the third optical system 240 are not specifically limited to the shown positions of FIGS. 8 to 11. In particular, the relative positions of the first lens 46, second lens 48, first light modulating element 50, polarizer element 56, etc. can be arranged and are not limited to the shown positions. For instance, in one example, the first light modulating element 50 can be positioned between the second lens 48 and the polarizer element 56 while still providing two different overall focal length changes.

Turning now to FIG. 12, a fourth example optical system 340 is illustrated. The fourth optical system 340 is illustrated somewhat generically/schematically for illustrative purposes (e.g., distances are generic). As with the optical system 40 of FIGS. 3 to 6, the second optical system 140 of FIG. 7, and the third optical system 240 of FIGS. 8 to 11, the fourth optical system 340 can be used in association with the video probe assembly 20, including the handset assembly 22, probe device 30, etc.

The fourth optical system 340 can include, in one example, at least some features similar to the optical system 40 of FIGS. 3 to 6, the second optical system 140 of FIG. 7, and the third optical system 240 of FIGS. 8 to 11. For instance, the fourth optical system 340 can include the imager 42, the first lens 46, the second lens 48, and the first light modulating element 50. These features are generally identical as described above and need not be described in detail again.

The fourth optical system 340 can include the second lens 48 positioned on a side of the first lens 46 that is opposite the target 41. The first light modulating element 50 can be positioned on a side of the second lens 48 opposite the first lens 46. The polarizer element 56 can be positioned on a side of the first light modulating element 50 opposite the second lens 48. In this example, the first lens 46 and second lens 48 might be spaced apart a farther distance than in the examples of FIGS. 3 to 11. By being spaced a farther distance apart, the first lens 46 and second lens 48 can provide a larger focal length change as compared to an optical system with a single lens. In operation, the fourth optical system 340 can provide two separate focal length changes.

It is to be appreciated that the structures of the fourth optical system 340 are not specifically limited to the shown positions of FIG. 12. In particular, the relative positions of the first lens 46, second lens 48, first light modulating element 50, polarizer element 56, etc. can be arranged and are not limited to the shown positions. For instance, in one example, the first light modulating element 50 can be positioned between the first lens 46 and the second lens 48 while still providing two separate focal length changes.

Referring still to FIG. 12, the fourth optical system 340 is illustrated in a first mode of operation. In this example, the first light modulating element 50 can be turned on (illustrated as "ON" in FIG. 12). The o-beam ray 64 and e-beam ray 66 can each pass through the first lens 46 that has a focal length of $f1_e$ and $f1_e$, respectively. Next, the o-beam ray 64 and e-beam ray 66 can pass through the second lens 48 that has a focal length of $f2_o$ and $f2_e$, respectively. Next, the o-beam ray 64 and e-beam ray 66 can pass through the first light modulating element 50, which is turned on in this example, thus causing the o-beam ray 64 and e-beam ray 66 to be modulated/changed. In particular, the polarization state of the o-beam ray 64 and e-beam ray 66 is modulated/changed upon passing through the first light modulating element 50, such that the o-beam ray 64 changes to the e-beam ray 66, while the e-beam ray 66 changes to the o-beam ray 64.

After exiting the first light modulating element 50, the o-beam ray 64 and e-beam ray 66 can arrive at the polarizer element 56. In this example, the polarizer element 56 will filter out vertical linearly polarized light rays (e.g., e-beam rays 66). As such, o-beam rays 64 can pass through the polarizer element 56 while e-beam rays 66 are filtered out and prevented from passing through the polarizer element 56. In this example, the o-beam rays 64 that pass through and exit the polarizer element 56 can be focused onto the imager 42.

Turning now to FIG. 13 it should be appreciated that the shown distances, in particular the distance to the target 41 since the distance can vary, are only generic and are not to be taken as reference and should not be taken in comparison to FIG. 12. In FIG. 13, the fourth optical system 340 is illustrated in a second mode of operation. In this example, the first light modulating element 50 can be turned off (illustrated as "OFF" in FIG. 13). The o-beam ray 64 and e-beam ray 66 can each pass through the first lens 46 that has a focal length of $f1_o$ and $f1_e$, respectively. Next, the o-beam ray 64 and e-beam ray 66 can pass through the second lens 48 that has a focal length of $f2_o$ and $f2_e$, respectively. Next, the o-beam ray 64 and e-beam ray 66 can pass through the first light modulating element 50, which is turned off in this example. As such, the o-beam ray 64 and e-beam ray 66 passing through the first light modulating element 50 are not modulated/changed, such that the polarization state of the o-beam ray 64 and e-beam ray 66 will remain the same upon exiting the first light modulating element 50.

After exiting the first light modulating element 50, the o-beam ray 64 and e-beam ray 66 can arrive at the polarizer element 56, which filters out vertical linearly polarized light rays (e.g., e-beam rays 66). As such, o-beam rays 64 passing through the polarizer element 56 are focused onto the imager 42.

Figure 14:
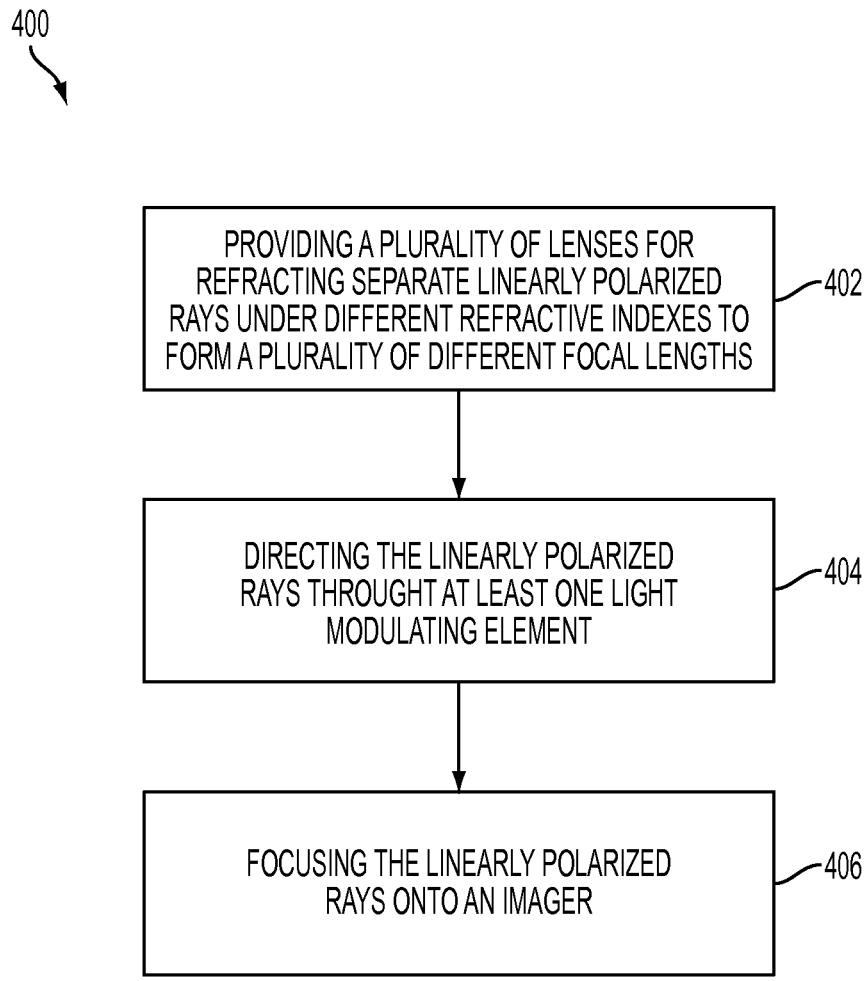
FIG. 14 is a flow chart illustrating a method of inspecting a target with one of the optical systems.

Turning now to FIG. 14, a method 400 of inspecting the target 41 with the optical system 40, 140, 240, 340 of the video probe assembly 20 is provided. In an example, the method 400 includes a step 402 of providing a plurality of lenses (e.g., first lens 46 and second lens 48) for refracting separate linearly polarized rays (e.g., o-beam rays 64 and e-beam rays 66) under different refractive indexes to form a plurality of different focal lengths. For example, as described above, the optical system 40, 140, 240, 340 can provide any number of different focal length changes, such as by providing two different focal lengths, four different focal lengths, etc.

In an example, the method 400 includes a step 404 of directing the linearly polarized rays (e.g., o-beam rays 64 and e-beam rays 66) through at least one light modulating element (e.g., first light modulating element 50 and second light modulating element 52). In an example, the method 400 includes a step 406 of focusing the linearly polarized rays onto imager 42. For example, o-beam rays 64 or e-beam rays 66 that pass through polarizer element 56 can be focused onto the imager.

It is to be appreciated that the optical systems 40, 140, 240, 340 described above can provide a plurality of focal length changes, which can produce a larger depth of field in, e.g., the probe head 32. With a larger depth of field, targets within an enclosed area can be more clearly viewed with the video probe assembly 20. Further, with a larger focal length range, more discrete zoom changes may also be achieved.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. An optical system in a video probe assembly, the optical system including:
   a plurality of lenses, each having at least one curved surface, configured to refract separate decomposed linearly polarized rays under different refractive indexes to form a plurality of different focal lengths;
   a plurality of light modulating elements each configured to modulate a polarization state of the linearly polarized rays proceeding from at least one of the plurality of lenses and passing through the respective light modulating elements in response to a control signal; and
   a polarizer element configured to filter out some of the linearly polarized rays proceeding from at least one of the plurality of light modulating elements and passing through the polarizer element; and
   an imager located adjacent to the polarizer element to receive polarized rays proceeding from the polarizer element.

2. The optical system of claim 1, wherein the lenses each include birefringent elements.

3. The optical system of claim 1, wherein the plurality of light modulating elements include a first light modulating element and a second light modulating element.

4. The optical system of claim 3, wherein the plurality of lenses includes a first lens and a second lens.

5. The optical system of claim 4, wherein the first light modulating element is positioned between the first lens and the second lens.

6. The optical system of claim 5, wherein the second light modulating element is positioned between the second lens and the polarizer element.

7. The optical system of claim 1, wherein the linearly polarized rays passing through the plurality of lenses are configured to produce at least four different focal lengths.

8. The optical system of claim 1, wherein the polarizer element is rotatable.

9. The optical system of claim 8, wherein the rotation of the polarizer element is configured to filter out at least some of the linearly polarized rays.

10. The optical system of claim 1, wherein the linearly polarized rays include ordinary ray light and extra-ordinary ray light.

11. An optical system in a video probe assembly, the optical system including:
    a plurality of lenses, each having at least one curved surface, configured to refract separate linearly polarized rays under different refractive indexes to form a plurality of different focal lengths;
    at least one light modulating element configured to modulate a polarization state of the linearly polarized rays passing through the at least one light modulating element in response to a control signal; and
    a rotatable polarizer element configured to filter out some of the linearly polarized rays passing through the polarizer element; and
    an imager located adjacent to the polarizer element to receive polarized rays proceeding from the polarizer element.

12. The optical system of claim 11, wherein the lenses each include birefringent elements.

13. The optical system of claim 12, wherein the at least one light modulating element includes a first light modulating element and a second light modulating element.

14. The optical system of claim 13, wherein the plurality of lenses includes a first lens and a second lens.

15. The optical system of claim 14, wherein the first light modulating element is positioned between the first lens and the second lens.

16. The optical system of claim 15, wherein the second light modulating element is positioned between the second lens and the polarizer element.

17. The optical system of claim 16, wherein the linearly polarized rays passing through the plurality of lenses are configured to produce at least four different focal lengths.

18. The optical system of claim 11, wherein the rotation of the polarizer element is configured to filter out at least some of the linearly polarized rays.

19. A method of inspecting a target with an optical system of a video probe assembly, the method including:
    providing a plurality of lenses, each having at least one curved surface, for refracting separate decomposed linearly polarized rays under different refractive indexes to form a plurality of different focal lengths;
    directing the linearly polarized rays through at least one light modulating element; and
    focusing the linearly polarized rays proceeding from a polarizer element onto an imager.

20. The method of claim 19, further including the steps of:
refracting one of the linearly polarized rays by a first refractive index;
refracting another of the linearly polarized ray by a second refractive index; and
modulating a polarization state of the linearly polarized rays.

\* \* \* \* \*

UNITED STATES PATENT AND TRADEMARK OFFICE
CERTIFICATE OF CORRECTION

| | | |
|---|---|---|
| PATENT NO. | : 8,970,934 B2 | Page 1 of 1 |
| APPLICATION NO. | : 13/922513 | |
| DATED | : March 3, 2015 | |
| INVENTOR(S) | : Dongmin Yang | |

It is certified that error appears in the above-identified patent and that said Letters Patent is hereby corrected as shown below:

In the specification

Column 16, line 32, please delete "$fl_e$" and insert therefor --$fl_o$--.

Signed and Sealed this
Sixteenth Day of February, 2016

Michelle K. Lee
*Director of the United States Patent and Trademark Office*